(12) United States Patent
Bessette et al.

(10) Patent No.: US 12,642,313 B2
(45) Date of Patent: Jun. 2, 2026

(54) METHOD OF USING AN APPAREL POWER SYSTEM

(71) Applicant: KIMPEX INC., Drummondville (CA)

(72) Inventors: Robert Bessette, St-Jean sur Richelieu (CA); Robert Handfield, St-Lucien (CA)

(73) Assignee: KIMPEX INC., Drummondville (CA)

( * ) Notice: Subject to any disclaimer, the term of this patent is extended or adjusted under 35 U.S.C. 154(b) by 802 days.

(21) Appl. No.: 18/158,307

(22) Filed: Jan. 23, 2023

(65) Prior Publication Data

US 2023/0157384 A1     May 25, 2023

Related U.S. Application Data

(63) Continuation-in-part of application No. 16/437,015, filed on Jun. 11, 2019, now abandoned, which is a
(Continued)

(51) Int. Cl.
| | |
|---|---|
| *A41D 13/005* | (2006.01) |
| *A41D 1/00* | (2018.01) |
| *A41D 19/015* | (2006.01) |
| *A43B 3/35* | (2022.01) |
| *B62J 33/00* | (2006.01) |

(Continued)

(52) U.S. Cl.
CPC ......... *A41D 13/0051* (2013.01); *A41D 1/002* (2013.01); *A41D 13/0053* (2013.01); *A41D 19/01535* (2013.01); *A41D 19/01541* (2013.01); *A43B 3/355* (2022.01); *B62J 33/00*

(2013.01); *H02J 7/14* (2013.01); *H02J 50/90* (2016.02); *H05B 2203/036* (2013.01)

(58) Field of Classification Search
None
See application file for complete search history.

(56) References Cited

U.S. PATENT DOCUMENTS

| | | | | |
|---|---|---|---|---|
| 4,273,989 | A | | 6/1981 | Hinton et al. |
| 4,404,460 | A | * | 9/1983 | Kerr .................... H05B 1/0227 |
| | | | | 607/108 |

(Continued)

FOREIGN PATENT DOCUMENTS

| | | | | | |
|---|---|---|---|---|---|
| CN | 2764185 | Y | * | 3/2006 | |
| DE | 102016210714 | A1 | * | 12/2017 | .............. H02J 50/00 |

(Continued)

*Primary Examiner* — John J Norton
(74) *Attorney, Agent, or Firm* — Brouillette Legal Inc.; Robert Brouillette

(57) ABSTRACT

A method of using an apparel power system is disclosed. The method uses an apparel accessory to be powered and an apparel adaptor to create an electrical contact between a vehicle and the apparel accessory. The apparel power system provides a source of electrical energy for electrically powered accessories attached or integrated to the apparel accessory worn by the user of the vehicle without requiring the use of wires and plugs connections between the user and the vehicle. Contact between connecting elements of each of the apparel accessory, apparel adaptor and vehicle allow the electrical power to be transmitted between the vehicle to the apparel accessory and thereof the electrically powered accessories.

9 Claims, 8 Drawing Sheets

Related U.S. Application Data continuation-in-part of application No. 15/284,221, filed on Oct. 3, 2016, now abandoned.

(60) Provisional application No. 62/236,205, filed on Oct. 2, 2015.

(51) Int. Cl.
    *H02J 7/14*       (2006.01)
    *H02J 50/90*     (2016.01)

(56) References Cited

U.S. PATENT DOCUMENTS

| | | | | |
|---|---|---|---|---|
| 4,572,158 | A | | 2/1986 | Fiedler |
| 4,825,039 | A | * | 4/1989 | Yoo ........................ H05B 3/342 |
| | | | | 219/202 |
| 4,851,291 | A | | 7/1989 | Vigo |
| 4,856,294 | A | | 8/1989 | Scaringe |
| 4,894,931 | A | | 1/1990 | Senee |
| 6,763,671 | B1 | | 7/2004 | Klett |
| 2007/0019399 | A1 | | 1/2007 | Harris |
| 2009/0026056 | A1 | | 1/2009 | Dias et al. |
| 2015/0136754 | A1 | * | 5/2015 | Yester .............. A41D 19/01535 |
| | | | | 219/211 |
| 2016/0068214 | A1 | * | 3/2016 | Tang ........................ B62J 6/056 |
| | | | | 362/108 |
| 2017/0042261 | A1 | | 2/2017 | Kull et al. |
| 2019/0269180 | A1 | * | 9/2019 | Desmeules .......... A41D 19/001 |
| 2019/0289929 | A1 | * | 9/2019 | Bessette .................. B62J 33/00 |

FOREIGN PATENT DOCUMENTS

| | | | | | |
|---|---|---|---|---|---|
| JP | S59154479 | U | * | 10/1984 | ........... H05B 1/0272 |
| KR | 20020001702 | A | * | 1/2002 | ......... A41D 13/0051 |
| KR | 20080101315 | A | * | 11/2008 | .............. A43B 3/35 |
| WO | WO-2012114179 | A1 | * | 8/2012 | .............. B62J 33/00 |

* cited by examiner

METHOD OF USING AN APPAREL POWER SYSTEM

CROSS-REFERENCE TO RELATED APPLICATIONS

The present patent application claims the benefits of priority of U.S. Patent Application No. 62/236,205, entitled "Apparel Power System and Method of Using the Same", and filed at the United States Patent Office on Oct. 2, 2015 and is a continuation-in-part of U.S. application Ser. No. 16/437,015 filed on Jun. 11, 2019 that is a continuation-in-part of U.S. application Ser. No. 15/284,221 filed on Oct. 3, 2016, the content of which is incorporated herein by reference.

FIELD OF THE INVENTION

The present invention generally relates to a process to provide electrical power for clothing accessories worn or carried by the user of a vehicle such as a heater.

BACKGROUND OF THE INVENTION

There are presently two groups of personal thermo-regulated apparels. These two groups can be classified as active and passive. Active thermo-regulated apparel is designed to maintain the temperature that the user has selected while passive thermo-regulated apparel is not capable of maintaining the selected temperature over time. Currently available products in the active thermo-regulated apparel group are only capable of single applications such as heating or cooling. Current active heating technologies generally incorporate resistive heating. For example, Polartec® has integrated electrically resistive heating technology into a jacket. Similarly, compressive cooling is typically used in most currently available cooling apparel items.

Passive heating systems are generally chemical reaction heating systems. Likewise, passive cooling systems have included cooling with a phase change material, however, the systems currently available have not provided a system and process for heating and cooling that can be incorporated in wearable apparel for a wide variety of uses.

For example, U.S. Pat. No. 4,856,294 to Scaringe et al. describes a Micro-Climate Control Vest which contains a phase change material with a solid-to-liquid phase change as a cooling medium. The vest may also have an optional second phase change material layer of ice and an optional outer insulation layer. The inner liner containing the phase change material is divided into individual compartments due to the rigidity of the phase change material in its solid state. Thus, the apparel is rigid and inflexible making it uncomfortable to wear.

Another example of apparel incorporating phase change material is described in U.S. Pat. No. 4,894,931 to Senee et al. Senee describes a battery powered electric heating device incorporating phase change material such as salt for warming various body parts. The salt serves as a heat storage medium and as a temperature regulator for the resistance heater since it can absorb a lot of heat without rising above its melt temperature. As in many other devices of this nature, the rigidity of the system along with the rigidity of the salt make the system difficult to incorporate into various apparel items.

U.S. Pat. No. 4,572,158 to Fiedler describes a heating pad for warming body parts that use a supercooled phase change material salt solution for heat storage. The phase change material is liquefied and then can be cooled to room temperature without solidifying. A trigger is used to activate the salt, causing an exothermic crystallization. This device is sold with a cloth or neoprene cover to prevent burns when it is placed against the skin. Furthermore, this system is difficult to incorporate into apparel for heating and cooling the body.

U.S. Pat. No. 4,851,291 to Vigo et al. describes another method of making fibers with thermal storage properties by filling the core of a hollow fiber with a phase change material or absorbing a phase change material onto the surface of a non-hollow fiber. The phase change materials described include cross-linked polyethylene glycol and plastic crystals that have a solid-to-solid crystalline phase change. These fibers do not allow absorption of enough phase change material into the containment material to be of practical use in heating or cooling.

U.S. Pat. No. 6,763,671 to Klett et al. describes a closed-cycle cooling and protective apparatus. The apparatus includes a thermal battery cooling source. Unfortunately, this system is rigid and must be completely closed. Furthermore, even a small amount of damage to the system would render the system non-functional making it unsuitable for harsh use conditions.

Although several heating systems exist, they all require energy. On one hand, battery powered systems require recharging of the battery and may not last for the full duration of long vehicle rides. On the other hand, wired system requires that the apparel be hard wired to the vehicle creating a situation which is not desirable for recreational vehicles. As such, both systems have significant shortcomings when used with recreational vehicle specifically for such vehicle that may be in use for prolonged periods of time.

SUMMARY OF THE INVENTION

The shortcomings of the prior art are generally mitigated by providing a heated clothing system which provide a source of electrical energy to the apparel worn by the driver or user of a vehicle without the need for a hard-wired link between the driver and the vehicle. The vehicle may be a snowmobile, ATV, UTV, motorcycle, watercraft or any like recreational vehicle or motor vehicle where electrically powered apparel or equipment accessories are worn by the driver. As such, the word 'vehicle' as used throughout should not be limited to the types of vehicles listed above but should be understood as including any suitable vehicle which the person with the skills in the art would recognize as such.

An object of the present invention is to provide a power system comprising not only an electrical power generating source connected to the engine of the vehicle but also a rechargeable battery storage embedded in the apparel.

According to one aspect of the present invention, the electrical energy is transferred from the steering means to the handwear upon holding of the steering means by the user and subsequently from the handwear to the apparel thus providing the ability to power one or more accessories such as a heating system and preferably a rechargeable battery embedded in or mounted in or on the apparel. The handwear may be integrated to the apparel.

The battery may be used to power various accessories such as heated handwear, vest, pants and/or footwear, power visor visibility lamps, a cell phone, etc. . . . . So even when hands are not on the steering means, there is always electrical power in the energy source, typically a battery to power the various accessories.

An apparel power system comprising a steering means connector, a handwear connector, an apparel having a battery operatively connected to the handwear connector and one or more heating module(s) or electrically powered accessories mounted on the apparel or in connection therewith (for example power visor, visibility lamps).

According to one aspect of the present invention, a thermo-regulated apparel power system for use with a vehicle has a steering means and comprises a vehicle electrical power generating source electrically connected to first contact connection means disposed on the steering means of the vehicle, the apparel power system comprising:

one or two handwears adapted to be worn by a user;
one or more apparels adapted to be worn by a user;
an electrically powered heat control device attached or integrated to one said apparel;
apparel connectors configured to transfer energy between one of said handwear and said heat control device;
second contact connection means attached or integrated to one of said handwear, said second contact connection means adapted to operatively connect the vehicle power generating source and the heat control device when placed in contact with said first contact connection means.

According to another aspect of the present invention, there is provided a thermo-regulated apparel power system for use with a vehicle having a steering means and comprising a vehicle electrical power generating source electrically connected to first contact connection means disposed on the steering means of the vehicle, the apparel power system comprising:

a. one or more handwear adapted to be worn by a user;
b. one or more apparels adapted to be worn by a user;
c. an electrically powered heating device attached or integrated to one of said apparels;
d. a power storage unit embedded in the apparel which is electrically connected to said heating device;
e. apparel connectors configured to transfer energy between one of said handwear and one of said apparel;
f. second contact connection means attached or integrated to one of said handwear, said second contact connection means adapted to operatively connect the power generating source and the heating device when placed in contact with said first contact connection means.

According to another aspect of the present invention, a method of powering an apparel accessory worn by the driver or user of a vehicle having steering means without the need for a hard-wired link between the driver and the vehicle is described, said method comprising the steps of:

a. wearing an apparel having at least one sleeve and at least one handwear;
b. connecting handwear connection elements on the at least one handwear to a lower extremity of the at least one sleeve of the apparel;
c. activating the apparel accessory;
d. placing the at least one handwear on the steering means of the vehicle; and
e. substantially aligning positive and negative handwear connectors over corresponding positive and negative steering means connection elements.

According to one aspect of the present invention an item of apparel for heating or cooling is disclosed. The apparel comprising a power storage unit, such as a battery, an actuator or switch, a heating or cooling module operatively connected with the power storage unit and an apparel connector electrically connected to the power storage unit. The apparel connector having a positive and negative pole connection configured to interact in an electrically conductive manner with a complementary vehicle connector located on the vehicle steering means.

According to one embodiment of the present invention, the heated apparel power system and method of using the same may be used by a variety of users, such as operators of agricultural machinery, forestry equipment and industrial machinery. Applications of one embodiment of such system may also be useful in the mining industry where the temperature may vary. The miners most often have regular interactions with machinery which would allow them to transfer power to the apparel via the user interaction.

According to one embodiment of the present invention, the heated apparel power system is configured to allow an apparel to keep a temperature of about 45 to about 60 degree Celsius for different levels of intensity. The heated apparel power system is also typically suited with a power storage unit having an autonomy of about two hours on a full charge with a use of the heated pad at the minimum intensity level. According to one embodiment, the heated apparel has the ability to power essential apparel props such as coat and/or handwear when relying solely on the power storage unit, that is when the contact between the pilot and the vehicle is interrupted.

According to yet another aspect of the present invention, the apparel power system is designed to be without any negative impact on the operator comfort while preferably not harming the aesthetic of the components.

According to one aspect of the present invention, the apparel power system is compatible with a power supply having about 12 to about 13.8 volts while requesting a power of about 5-15 Amps.

According to another aspect of the present invention, the apparel power system may be designed with a power supply having about 24 to about 30 volts while requesting a power of about 3-10 Amps.

According to yet another aspect of the present invention, the apparel power system comprises a hand held adaptor that may be held by the user instead of usual handwear or may be worn over a handwear. The wearable adaptor is an adaptor the user wears on his hand when the user is not wearing handwear. The wearable adaptor may transfer the power from the vehicle handle bar to the apparel or accessories upon contact and thus powers accessories while the handwear are not required. Such an embodiment may be of use on hot weather days on a motorcycle while user worn accessories need to be powered but while the user prefers to ride without the use of handwear. The handheld/wearable adaptor is configured to transfer vehicle power to the apparel without the need of hard wiring. The handheld/wearable adaptor typically transfers power from the contact between the user's hand and the vehicle steering wheel or handle bar.

According to yet another aspect of the present invention, a method of powering an apparel accessory worn by a user of a vehicle without a hard-wired link between the user and the vehicle is provided, the method comprising the steps of: wearing the apparel accessory to be powered comprising positive and negative connecting elements; wearing an apparel adaptor comprising a first set and a second set of positive and negative connectors; aligning each of the first set of positive and negative connectors of the apparel adaptor with the corresponding positive and negative connecting elements of the apparel accessory; detachably securing the apparel adaptor to the apparel accessory by connecting the first set of positive and negative connectors to the corresponding positive and negative connecting elements, the connection allowing current to flow between the apparel adaptor to the apparel accessory; aligning each of the second set of positive and negative connectors of the apparel adaptor with a corresponding respective any one of a plurality of positive and any one of a plurality of negative connection elements of the vehicle; and powering the apparel accessory by connecting the aligned positive and negative connectors of the apparel adaptor to the corresponding respective any one of the plurality of positive and any one of the plurality of negative connection elements of the vehicle, the connection allowing current to flow between the vehicle and the apparel adaptor.

According to yet another aspect of the present invention, the apparel adaptor may be a handheld or wearable adaptor. The method may further comprise the step of thermo-regulating the apparel accessory. The apparel accessory may comprise a heating system. The apparel accessory may comprise a cooling system. The method may further comprise thermo-regulating the apparel accessory to keep a temperature of 45 to 60 degree Celsius.

According to yet another aspect of the present invention, the first set of positive and negative connectors of the apparel adaptor may comprise a male or a female snap button complementary to a female or a male snap button of the positive and negative connecting elements of the apparel accessory.

According to yet another aspect of the present invention, the method may further comprise actuating a switch adapted to control an energy transfer from an embedded battery of the vehicle to the apparel accessory.

According to yet another aspect of the present invention, the method may further comprise magnetically securing the first set of positive and negative connectors of the apparel adaptor to the positive and negative connecting elements of the apparel accessory.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

Figure 1:
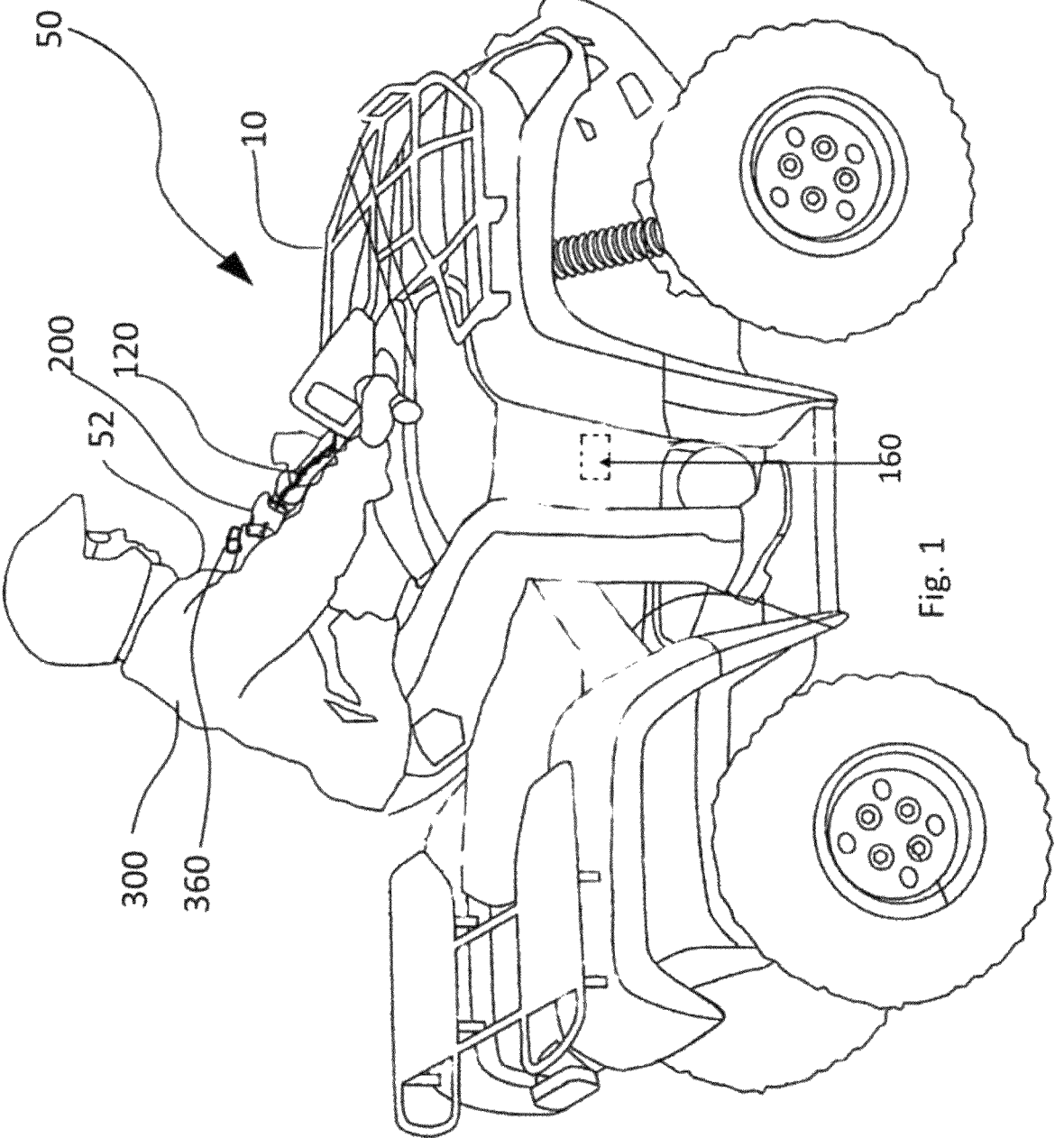
FIG. 1 is a side view of an ATV having an exemplary apparel power system installed thereto.

A novel method of using an apparel power system will be described hereinafter. Although the invention is described in terms of specific illustrative embodiments, it is to be understood that the embodiments described herein are by way of example only and that the scope of the invention is not intended to be limited thereby.

Referring now to FIGS. 1-4, according to one embodiment, the system comprises a power source (the vehicle), a vehicle connector (typically attached to the handle bar), a vehicle power to connector interface, an apparel connector, electrical connection means between the apparel connector and a power storage (for example a battery) attached or integrated to the apparel and/or to one or more accessories requiring the power.

The apparel power system 50 comprises an energy transfer means linking the apparel worn by a user 52 of a vehicle 10 to a power generating source 160, typically the vehicle's 10 own energy generation system which includes a generator in the case of gasoline powered vehicle and the vehicle's main battery in the case of an electrically powered vehicle. The energy transfer occurs through contact of apparel connectors with the vehicle connectors without the need for a hardwired connection. Accordingly, the energy is transferred from the vehicle 10 to the user's apparel 200, 300 through the contact of the apparel connectors generally disposed on the palm and/or finger portion of at least one handwear 200 and the corresponding vehicle connectors disposed on the hand receiving surface of the handlebar 82 matching the side of the handwear 200 having the connector. Recreational motor vehicles generally require handling of the handlebar during use of the vehicle 10, therefore the user's handwear 200 is at least in contact with the handlebar 82 of the vehicle 10 during its use and most likely almost always in contact with the handlebar 82.

Figure 2:
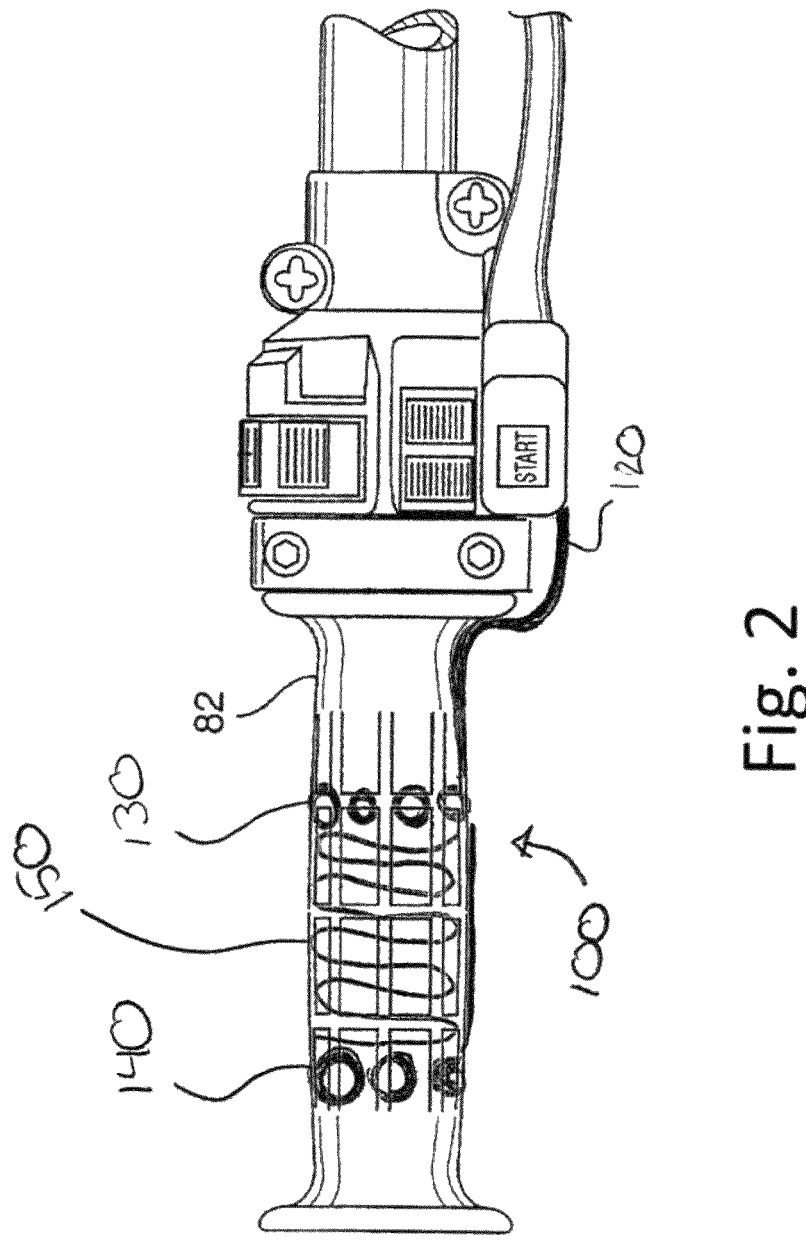
FIG. 2 is close up view of the right-side handlebar of the ATV of FIG. 1.
Figure 3:
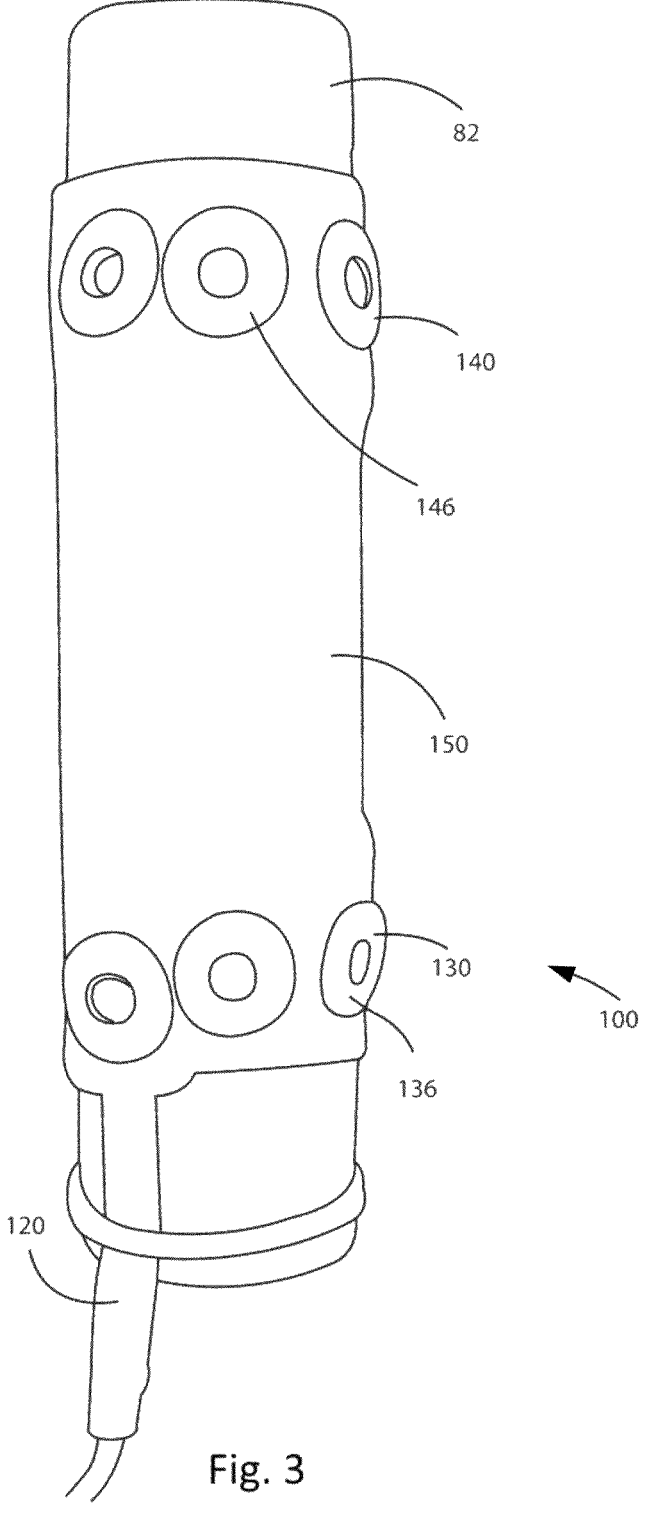
FIG. 3 is an illustration of handlebar having an exemplary apparel power system installed thereto.
Figure 4:
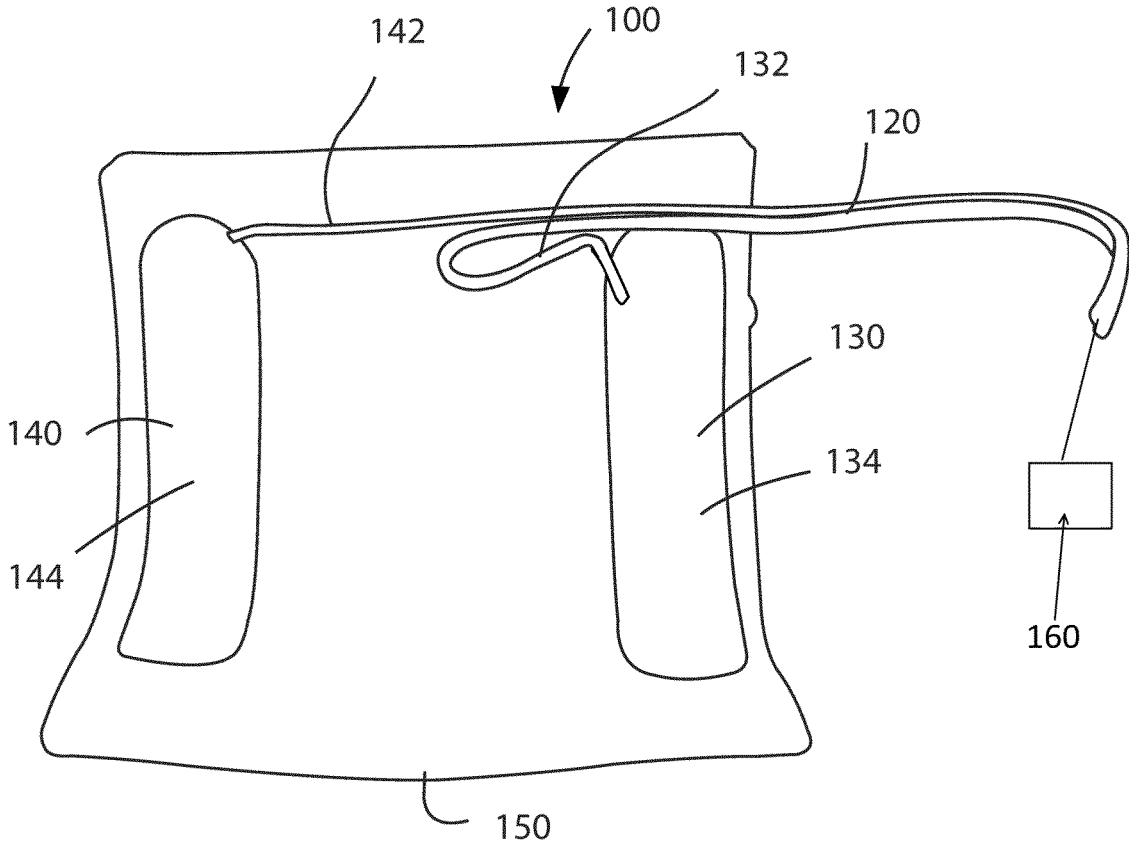
FIG. 4 is a under plan view of an un-mounted exemplary apparel power system without the stitching.

According to one embodiment, now referring to FIGS. 2-4, the apparel power system 50 has a handlebar connector 100 for transmitting the energy to apparel worn by the user, preferably to the user's handwear 200 (see FIG. 5), a positive pole connection element 130, a negative pole connection element 140, a nonconductive intermediate element 150 and a securing element for securely mounting the handlebar connector 100 to the vehicle handlebar 82. The handlebar connector 100 also referred to as the vehicle connector comprises a wire connection 120 for connecting the vehicle 10 power source, typically the vehicle electrical system or battery (not shown) to the vehicle connector 100. The wire connection 120 is preferably a two wire 132, 142 connection respectively linking the positive pole connection element 130 and the negative pole connection element 140 to their respective positive and negative poles on the vehicle power source. The positive and negative wire connections 132, 142 may be secured to the nonconductive intermediate element 150 for preventing movement of the wires and reducing the risk of disconnection. In the present embodiment, the positive pole connection element 130 and negative pole connection element 140 are spaced apart to prevent electrical shortcut resulting from a simultaneous contact on both the positive and the negative connection elements 130, 140 and one of the handwear connection elements 230, 240. The vehicle positive and negative pole connection elements 130, 140 may be made from a conductive material such as copper strips 134, 144 having protruding contact portions 136, 146 such as conductive material rings being inserted through the nonconductive intermediate element 150.

Figure 5:
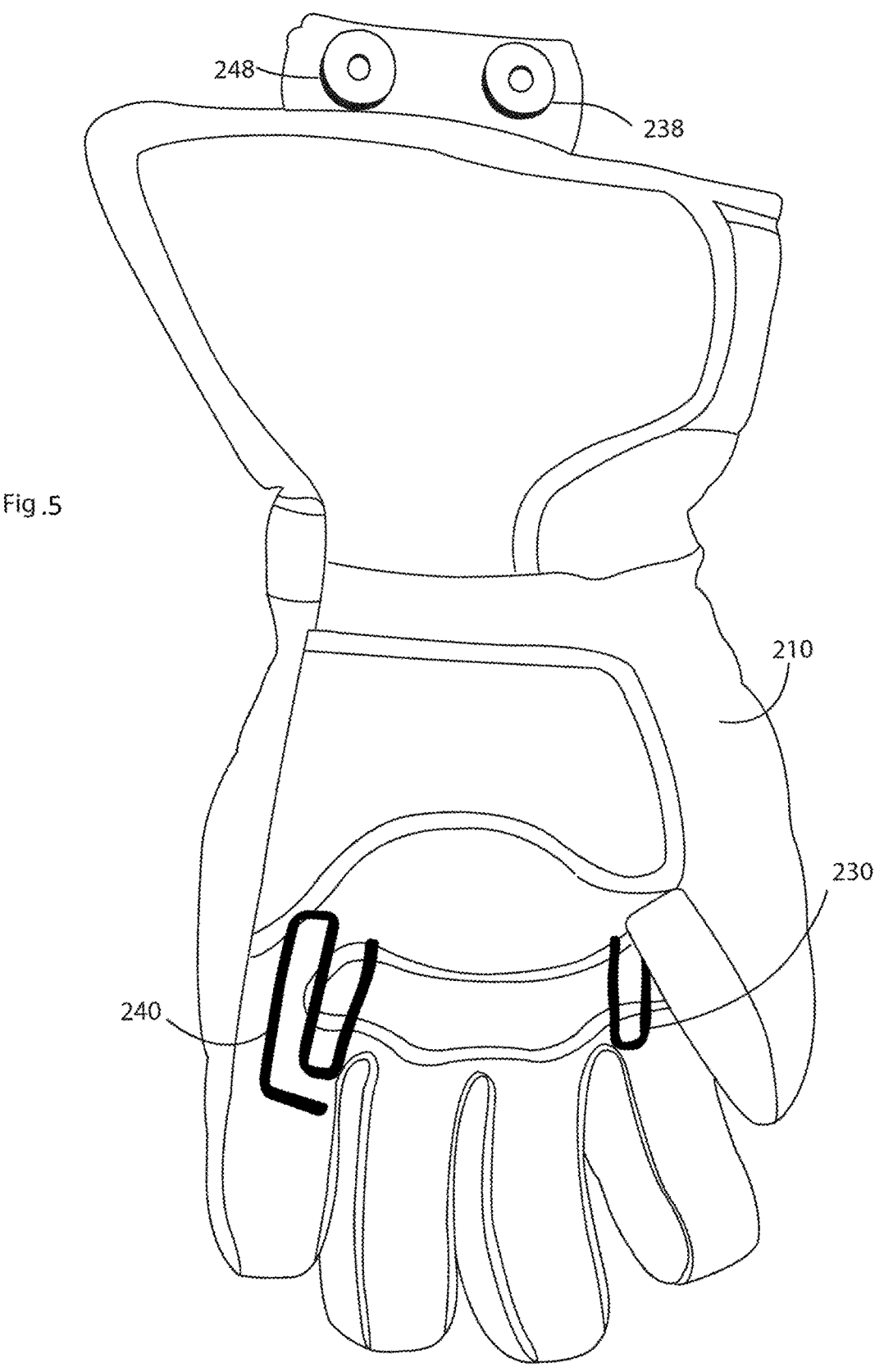
FIG. 5 is a under plan view of an exemplary glove compatible with the apparel power system.

Now referring to FIG. 5, according to one embodiment, a handwear 200 compatible with the present apparel power system is shown. The handwear 200 comprises a main handwear body 210, a positive pole and a negative pole handwear connector 230, 240, respectively interconnected by a positive and a negative wire connection (not shown) to a positive pole and a negative pole handwear connection element 238, 248. The positive pole and negative pole handwear connectors 230, 240 are disposed on either side of the palm/finger portion of the main handwear body 210 in as similar disposition as the positive pole and the negative pole handlebar connection elements 130, 140 to maximize likelihood of contact (i) between the positive pole handwear connection element 230 and the positive pole handlebar connection element 130 and (ii) the negative pole handwear connection element 240 and the negative pole handlebar connection element 140. The positive and negative wire connections (not shown) are preferably embedded within the main handwear body 210 fabric thus shielding the electrical connections from environmental contact and contact with the user's body. The main handwear body 210 is made from non-electrically conductive or insulating material to prevent any electrical shorts between either the positive pole and the negative pole handlebar connection elements 130, 140 or the positive pole and the negative pole handwear connectors 230, 240. The positive pole and negative pole handwear connection elements 238, 248 are preferably male or female pressure button elements complementary to female or male pressure button elements located on a jacket or coat 300 arm sleeve 310 of the corresponding hand side of the handwear 200 compatible with the apparel power system.

Figure 6:
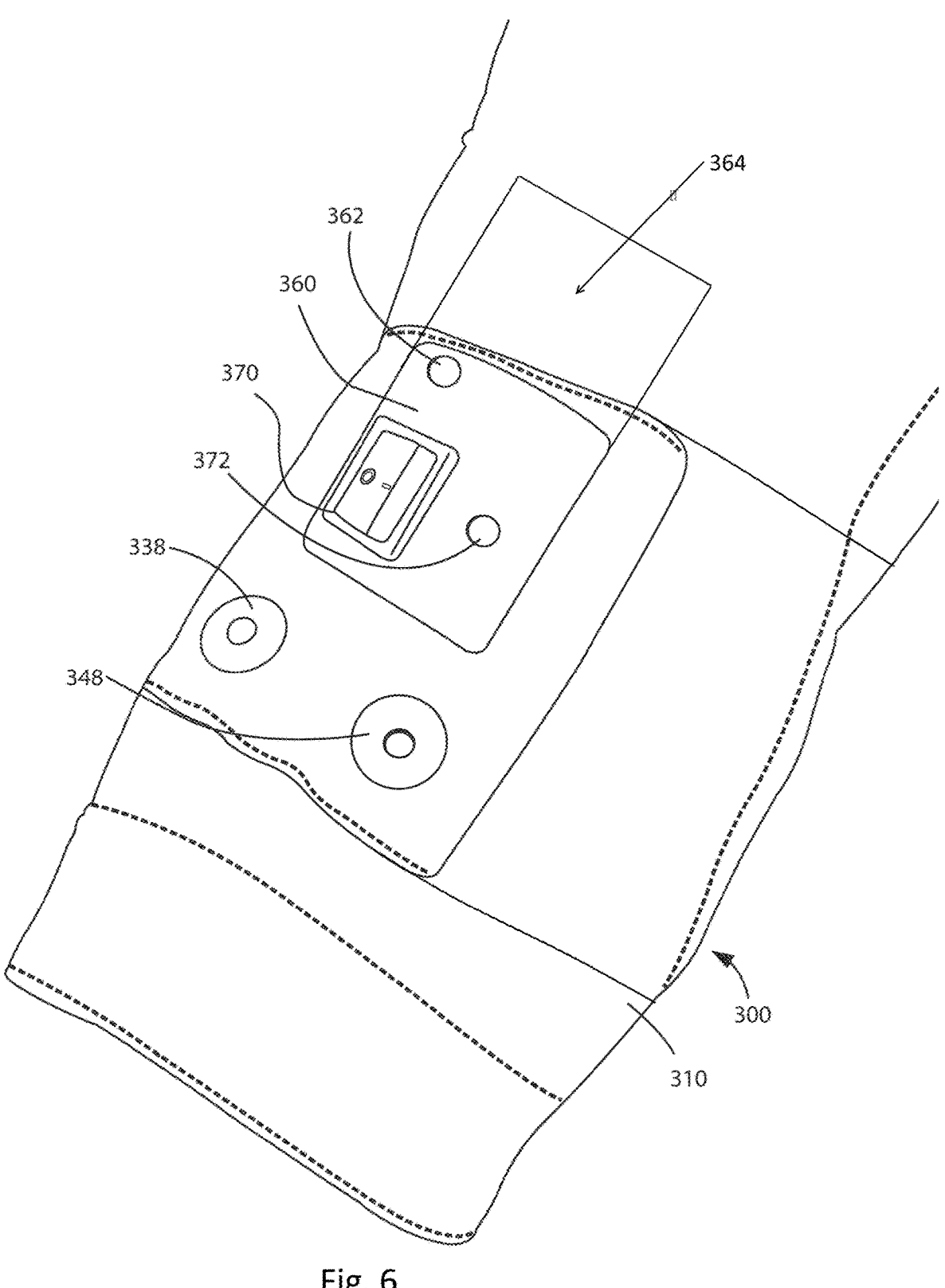
FIG. 6 is a partial top view of an exemplary coat compatible with the apparel power system.

Now referring to FIG. 6, according to one embodiment, the vehicle user's coat 300 comprises a power storage unit 360. The power storage unit 360 comprises an embedded battery 364 and an optional visual charge indicator 362. The power storage unit 360 is preferably operatively connected to an On/Off switch 370 having an optional visual On/Off indicator 372 there beside. Furthermore, the coat 300 arm sleeve 310 comprises positive pole and negative pole coat connection elements 338, 348 complementary to positive pole and negative pole handwear connection elements 238, 248. The positive pole and negative pole coat connection elements 338, 348 are in electrical connection with the switch 370 and the power storage unit 360. The power storage unit 360 is additionally in connection with various accessories such as heated handwear, vest, pants and/or footwear, power visor, visibility lamps, cell phone, etc. The accessories having a central On/Off switch or an On/Off switch per accessory. According to one embodiment, the central switch controls power to all equipment and accessories.

According to one embodiment, the vehicle user's apparel, such as the user's coat 300 comprises a plurality of power switches. For example, the first switch may manage the power for the apparel heating system while the second switch manages power to the apparel cooling system or auxiliary accessories such as the user's mobile phone. Therefore, a user could interrupt the heating system while keeping the auxiliary system ON. This would allow the user to recharge his phone while the apparel heating system is OFF or vice versa. According to other embodiment, the apparel power system may have no switch. An apparel power system without switch may be desired when the power is used for powering accessories that have their own ON/OFF switches or for charging mobile devices such as smart phones.

According to one embodiment, the handwear 200 may also be heated, in such an embodiment, the wired connection could be connected directly to the heating mechanism of the handwear or have the handwear 200 heating system in connection with the power storage unit. However, to insure constant current flowing to the heating handwear 200, the heating handwear 200 components should be in electrical connection with the power storage unit 360. Such connection would favor constant heating even without constant contact between the handwear 200 and the steering means 82 power transfer system. In other words, the power storage unit 360 or battery would be used as an energy buffer during contact interruption between the handwear 200 and the steering means 82.

According to one embodiment, both handwear 200 could be provided with embedded wiring as explained herein. In such a case, the apparel could have various configurations. For instance, each handwear connection could be connected to a separate power storage unit or to the same power storage unit.

The method of powering the apparel comprises the steps of wearing the apparel, securing (preferably magnetically) the handwear 200 connection elements 238, 248 to the apparel connecting elements 338, 348 located on the lower extremity of the coat's 300 arm 310, activating the On/Off switch 370 when required, placing the at least one hand having the handwear 200 on its corresponding steering means 82. Substantially aligning the positive pole and negative pole handwear connectors 230, 240 with the corresponding positive pole and negative pole vehicle connection elements 130, 140. The connection between the handwear 200 connection elements 238, 248 and apparel connecting elements 338, 348 allows the power to transfer from the handwear or handheld or wearable adaptor to the apparel or strap.

The method of installing the system comprise the steps of mounting the wire connection 120 to a vehicle 10 electrical system or power source and securely mounting the steering means connector 100 to at least one of the steering means 82 of the vehicle 10.

Figures 7, 8:
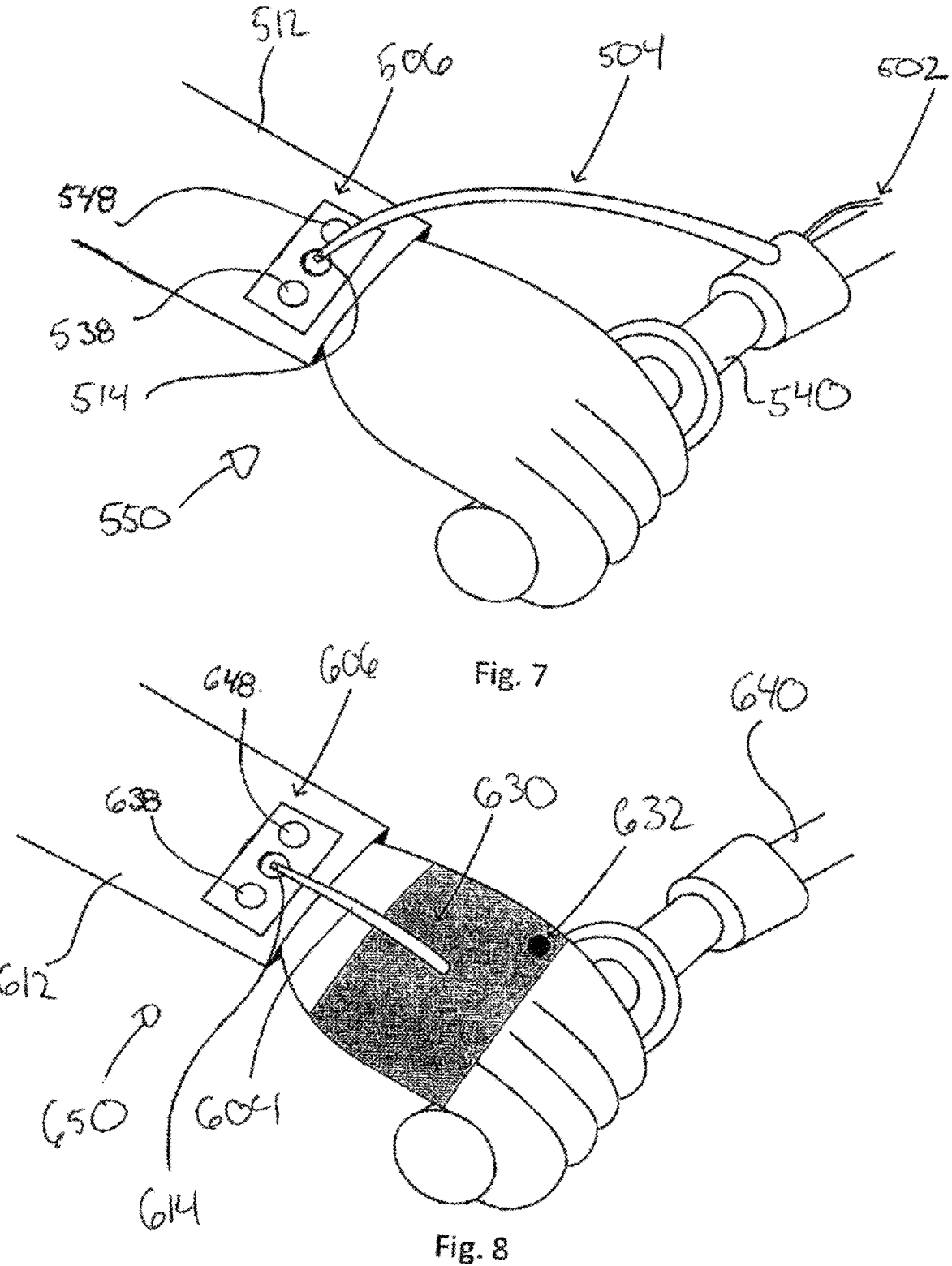
FIG. 7 is a schematic view of another embodiment of the apparel power system.
FIG. 8 is a schematic view of yet another embodiment of the apparel power system.

Referring now to FIGS. 6 and 7, according to one embodiment, the apparel power system 550 comprises a power source (the vehicle) wired 502 to the connecting arm 504 (typically a flexible semi rigid arm mounted to the vehicle handle bar), an apparel connector plate 506, apparel connecting elements 338, 348 allowing electrical connection between the apparel connector 506 and a power storage (for example a battery) attached or integrated to the apparel and/or to one or more accessories requiring power. The apparel connector plate 506 comprises a first and a second connecting element 538 and 548. The first and second connecting elements 538 and 548 are configured to be received by the apparel connectors 338, 438 (FIG. 6). In the preferred embodiment, the connecting elements 338, 348 and the apparel connectors 538 and 548 are magnetically secured while in contact. The magnetic connection allow the power transfer while providing an easy connection and release once the user releases the vehicle handle bars. Accordingly, upon contact between the apparel connector plate 506 connecting elements 538 and 548 and the apparel connectors 338, 348 (FIG. 6), the electrical current is transferred from the vehicle to the apparel for powering apparel accessories.

Still referring to FIGS. 6 and 7, the apparel power system 550 transfers electrical power from the vehicle (FIG. 1) to the apparel without the need for hardwire between the apparel and the vehicle (FIG. 1). As such, power is transferred from the vehicle (FIG. 1) to the apparel upon contact. Preferably, the connecting arm 504 is located at an optimal position such that while in use, the user's arm 512 is in contact with the apparel connector plate 506. According to one embodiment, the connecting arm 504 extremity 514 is pivotably secured to the apparel connector plate 506 for ease in contact between the apparel connectors 538, 548 and the apparel connecting element 338, 348.

The apparel power system 550 according to one embodiment may be integrated with motocross and handle bar element covering the hand of the user. As such, the handle bar hand cover may have electrical wiring integrated therein with an external connection that enters in contact with an apparel connector when the user is driving the vehicle. Understandably, handle bar hand covers of other vehicles would as well be used for transferring the power from the vehicle to the apparel for powering apparel accessories or devices held therein.

According to one embodiment, the apparel power system 50, 550, 650 is configured to transfer power from the vehicle to a user's device such as a mobile phone held within a pocket of the apparel. As such, a user may recharge his mobile device while riding a power vehicle without the need to have a hard wire between the user and the vehicle.

According to yet another embodiment, referring now to FIGS. 6 and 8, the apparel power system 650 comprises a power source (the vehicle), a vehicle connector, typically attached to the handle bar 640 or integrated thereto (not shown), a vehicle power to connector interface (not shown), an apparel connector 606, apparel connecting element 338, 348 (FIG. 6) providing electrical connection between the apparel connector 606 and the vehicle. In the present embodiment, the electrical connection between the vehicle and the apparel connector plate 606 is a body adaptor such as a handheld or wearable adaptor 630 which is in contact with the vehicle power. The body adaptor 630 comprises a connecting arm 604 and apparel connector plate 606. Preferably, the connecting arm 604 is located at an optimal position such that while in use, the user's arm 612 is in contact with the apparel connector plate 606. The apparel connector plate comprising first and second connectors 638, 648 for connecting to the corresponding apparel connecting elements 338, 348. In the preferred embodiment, the connecting elements 338, 348 and the apparel connectors 638 and 648 are magnetically secured while in contact. The magnetic connection allow the power transfer while providing an easy connection and release once the user releases the vehicle handle bars. Accordingly, upon contact between the apparel connector plate 606 connecting elements 638 and 648 and the apparel connectors 338, 348 (FIG. 6), the electrical current is transferred from the vehicle to the apparel for powering apparel accessories.

According to one embodiment, the connecting arm 604 apparel end 614 is pivotably secured to the apparel connector plate 606 for ease in contact between the apparel connectors 638, 648 and the apparel connecting element 338, 348. The apparel preferably comprises a power storage (for example a battery) attached or integrated to the apparel and/or to one or more accessories requiring the power.

According to yet another embodiment, referring now to FIG. 8, the body adaptor, also referred to wearable adaptor may also comprise an indicator 632, such as a lamp, indicating that the contact between the wearable adaptor and the vehicle connector is good and that power is transferred from the vehicle to the apparel or accessories.

According to another embodiment, the wearable adaptor is a strap that wraps around a portion of the user's body such as the user's hand to enter in contact with a vehicle connector. The wearable adaptor may also be hardwired to the apparel. While the wearable adaptor is hardwired to the apparel, there remains no hard wiring between the user and the vehicle, the power is transferred from the contact between the user's body and wearable adaptor and the vehicle connector.

According to yet another embodiment, the vehicle power may be transferred to the user's apparel through another body part. In such an embodiment, the apparel adaptor may be integrated to any portion of the user's body that is generally in contact with the vehicle. Understandably, the vehicle must as well be suited with a vehicle connector mounted to the vehicle portion which is in contact with the user's body. For example, the vehicle seat could have a vehicle connector mounted thereon and the user's apparel having an apparel connection or adaptor located about the user butt, legs or back corresponding to the portion of the body that is in contact with the vehicle connector.

It may be understood that the handwear 200 previously disclosed may be replaced by any other apparel adaptor 630 that is in contact with the vehicle 10 and its connectors 130, 140 and is not limited to apparel that is wearable on the hands only. As such, the apparel adaptor 630 may be comprised in pants, boots, jacket, etc. The apparel adaptor 630 therefore acts as the electrical liaison between the vehicle and the apparel accessory (550, 650, 700) to be powered.

According to another embodiment, a method of powering an apparel accessory (550, 650, 700) worn by a user of a vehicle 10 without a hard-wired link between the user and the vehicle 10 is provided, the method comprising the steps of: wearing the apparel accessory to be powered comprising positive and negative connecting elements; wearing an apparel adaptor comprising a first set and a second set of positive and negative connectors; aligning each of the first set of positive and negative connectors of the apparel adaptor with the corresponding positive and negative connecting elements of the apparel accessory; detachably securing the apparel adaptor to the apparel accessory by connecting the first set of positive and negative connectors to the corresponding positive and negative connecting elements, the connection allowing current to flow between the apparel adaptor to the apparel accessory; aligning each of the second set of positive and negative connectors of the apparel adaptor with a corresponding respective any one of a plurality of positive and any one of a plurality of negative connection elements of the vehicle; and powering the apparel accessory by connecting the aligned positive and negative connectors of the apparel adaptor to the corresponding respective any one of the plurality of positive and any one of the plurality of negative connection elements of the vehicle, the connection allowing current to flow between the vehicle and the apparel adaptor.

The method may further comprise the step of thermo-regulating the apparel accessory (550, 650, 700). A heating system, a cooling system or both may be comprised to thermo-regulate the apparel accessory. The apparel accessory may be thermos-regulated at a temperature of about 45 to 60 degree Celsius.

The method may further comprise actuating a switch adapted to control an energy transfer from an embedded battery of the vehicle to the apparel accessory (550, 650, 700).

The method may further comprise magnetically securing the first set of positive and negative connectors of the apparel adaptor 630 to the positive and negative connecting elements of the apparel accessory (550, 650, 700).

In yet another embodiment, the apparel adaptor 630 may be a handheld or wearable adaptor.

In yet another embodiment, the first set of positive and negative connectors of the apparel adaptor 630 may comprise a male or a female snap button complementary to a female or a male snap button of the positive and negative connecting elements of the apparel accessory (550, 650, 700).

Figure 9:
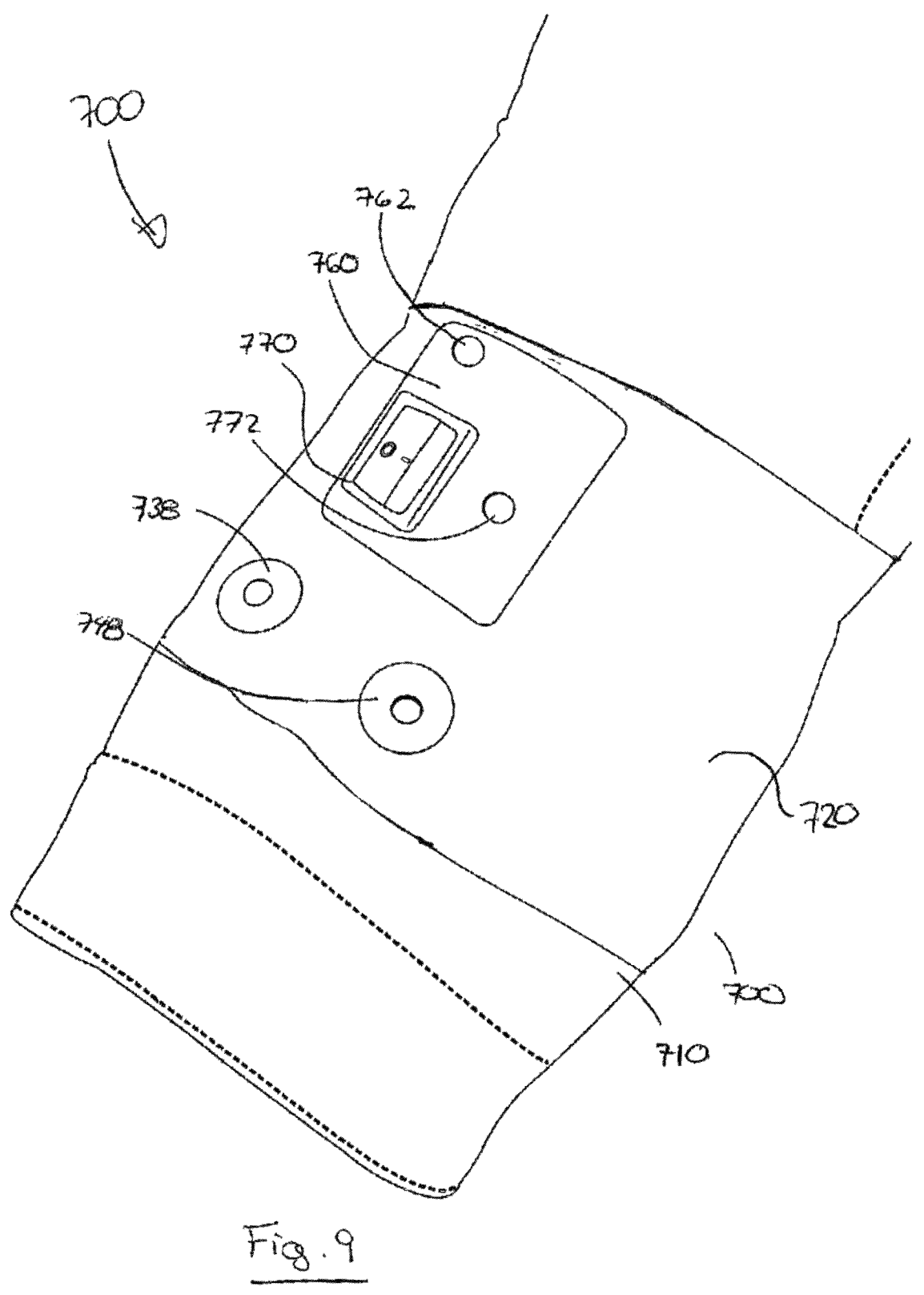
FIG. 9 is a partial top view of an exemplary strap embodiment compatible with the apparel power system.

Referring now to FIG. 9, according to one embodiment, the apparel power system 700 on the user's apparel such as the connecting element located on the coat's arm 710, is a strap that is wore on top or under of any apparel arm 710 or coat 700 arm 710. According to this embodiment, the apparel strap 720 allow a user to wear a strap and power accessories without the need of procuring a new coat having the power system capabilities. The strap 720 mounts around the vehicle user's coat 700 or arm and may comprise a power storage unit 760. The power storage unit 760 comprises an embedded battery (not shown) and an optional visual charging indicator 762. The power storage unit 760 is preferably operatively connected to an optional On/Off switch 770 having an optional visual On/Off indicator 772 there beside. Furthermore, the coat 700 arm sleeve 710 comprises positive pole and negative pole coat connection elements 738, 748 complementary to positive pole and negative pole handwear connection elements 238, 248, (FIG. 5) 538, 548, (FIG. 7) 638, 648 (FIG. 8). The positive pole and negative pole strap connection elements 738, 748 are in electrical connection with the switch 770 and the power storage unit 760. The power storage unit 760 is additionally in connection with various accessories such as heated handwear, heated vest, power visor visibility lamps, cell phone, etc. The accessories having a central On/Off switch board or an On/Off switch per accessory. The strap 720 may be wore directly on a vehicle user's arm and wired to the user mobile device for charging or operation while driving the vehicle.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method of powering an apparel accessory worn by a user of a vehicle without a hard-wired link between the user and the vehicle, comprising:

wearing the apparel accessory to be powered comprising positive and negative connecting elements;

wearing an apparel adaptor comprising a first set and a second set of positive and negative connectors;

aligning each of the first set of positive and negative connectors of the apparel adaptor with the corresponding positive and negative connecting elements of the apparel accessory;

detachably securing the apparel adaptor to the apparel accessory by connecting the first set of positive and negative connectors to the corresponding positive and negative connecting elements, the connection allowing current to flow between the apparel adaptor to the apparel accessory;

aligning each of the second set of positive and negative connectors of the apparel adaptor with a corresponding respective any one of a plurality of positive and any one of a plurality of negative connection elements of the vehicle;

powering the apparel accessory by connecting the aligned positive and negative connectors of the apparel adaptor to the corresponding respective any one of the plurality of positive and any one of the plurality of negative connection elements of the vehicle, the connection allowing current to flow between the vehicle and the apparel adaptor.

2. A method as defined in claim 1, wherein the apparel adaptor is a handheld or wearable adaptor.

3. A method as defined in claim 1, said method further comprising the step of thermo-regulating the apparel accessory.

4. A method as defined in claim 3, wherein the apparel accessory comprises a heating system.

5. A method as defined in claim 3, wherein the apparel accessory comprises a cooling system.

6. A method as defined in claim 3, said method further comprising thermo-regulating the apparel accessory to keep a temperature of 45 to 60 degree Celsius.

7. A method as defined in claim 1, wherein the first set of positive and negative connectors of the apparel adaptor comprises a male or a female pressure button complementary to a female or a male pressure button of the positive and negative connecting elements of the apparel accessory.

8. A method as defined in claim 1, said method further comprising actuating a switch adapted to control an energy transfer from an embedded battery of the vehicle to the apparel accessory.

9. A method as defined in claim 1, said method further comprising magnetically securing the first set of positive and negative connectors of the apparel adaptor to the positive and negative connecting elements of the apparel accessory.

\* \* \* \* \*